Sept. 1, 1959  V. E. MATULAITIS  2,902,586
EDM (DISC CUTTER)
Filed April 9, 1958  2 Sheets-Sheet 1
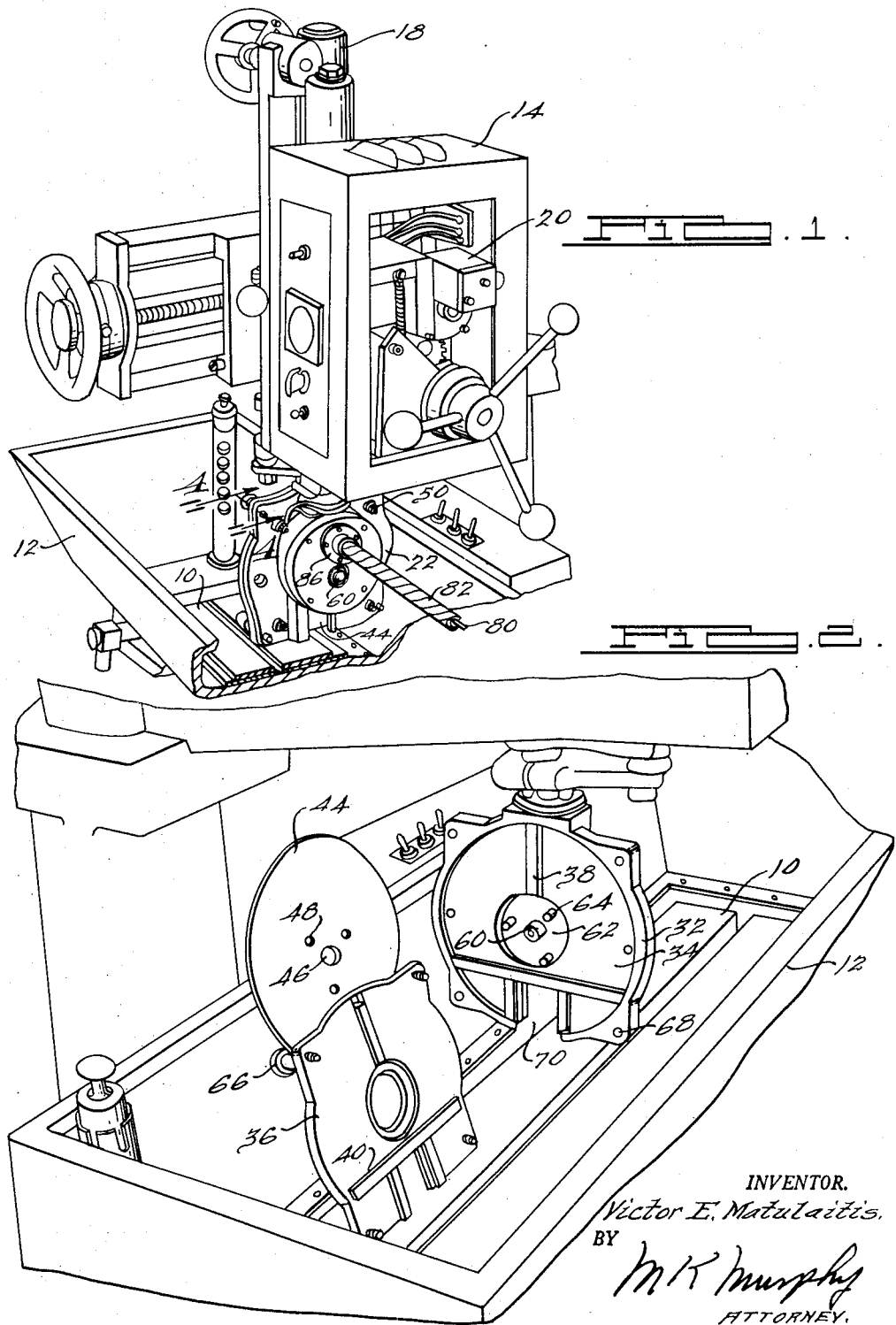
INVENTOR.
Victor E. Matulaitis.
BY
M K Murphy
ATTORNEY.

Sept. 1, 1959   V. E. MATULAITIS   2,902,586
EDM (DISC CUTTER)
Filed April 9, 1958   2 Sheets-Sheet 2
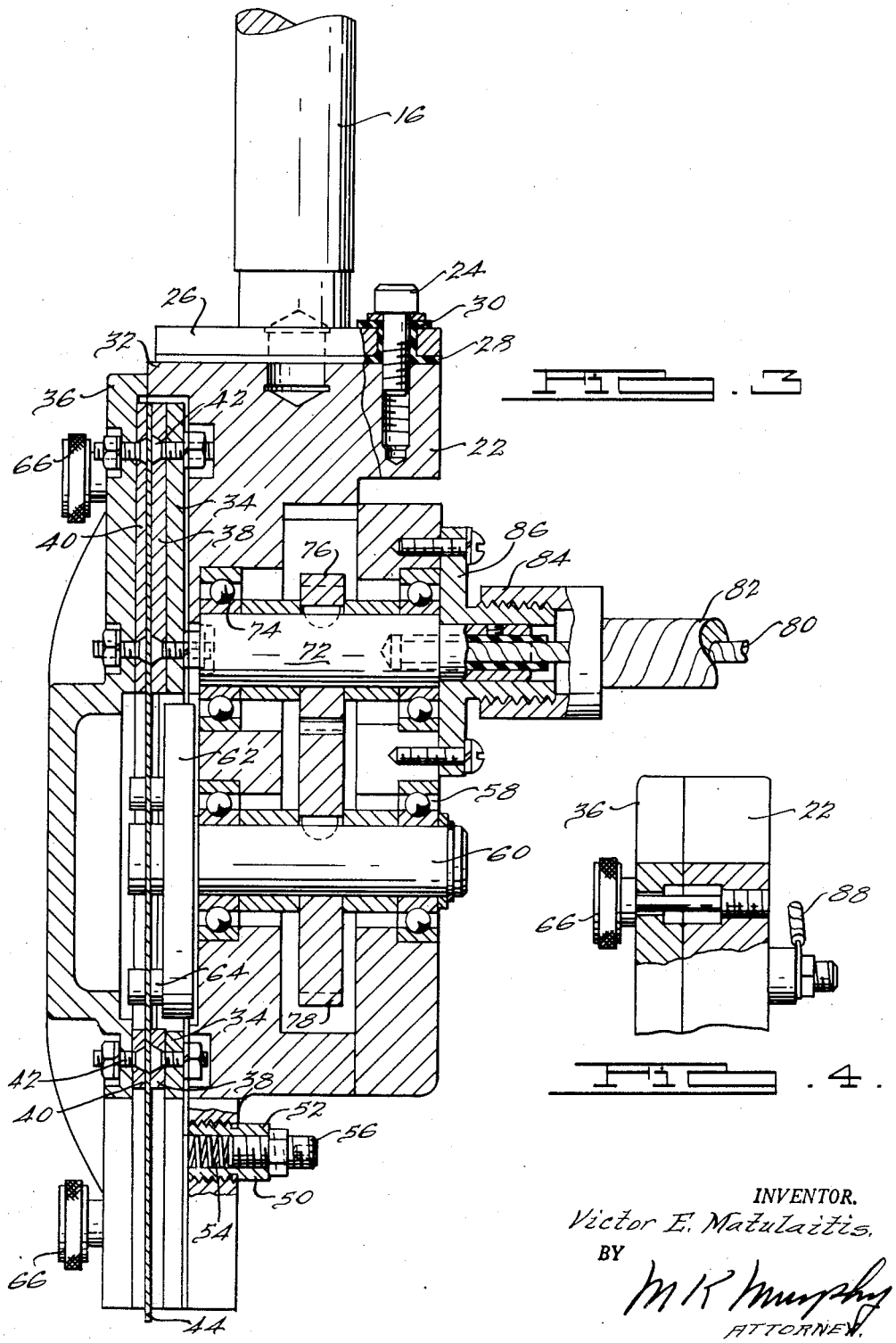
INVENTOR.
Victor E. Matulaitis,
BY
M K Murphy
ATTORNEY.

United States Patent Office

2,902,586
Patented Sept. 1, 1959

2,902,586

EDM (DISC CUTTER)

Victor E. Matulaitis, Franklin, Mich., assignor to Elox Corporation of Michigan, Royal Oak, Mich., a corporation of Michigan Application April 9, 1958, Serial No. 727,356

10 Claims. (Cl. 219—69)

This invention relates to electrical-discharge-machining, sometimes referred to as EDM, and particularly to an improved cut-off device for use with EDM power supplies for cutting hard metals, carbides and the like, which are difficult to cut with ordinary diamond wheels, saws, etc.

The principal object of my invention is to provide an improved cut-off disc, mounting and drive therefor, which will cut with greater accuracy and leave a better surface finish than those heretofore available.

Other objects and advantages will appear from the following specification, which taken in conjunction with the accompanying drawings, illustrates a preferred form of the invention.

In the drawings, in which reference characters have been used to designate like parts herein referred to:

Fig. 1 is a partial perspective view of an EDM machine tool with my improved cut-off device mounted thereon;

Fig. 2 is an enlarged view showing the cut-off disc and mounting in disassembled condition;

Fig. 3 is an enlarged section through the disc mounting head; and

Fig. 4 is a detail of the head taken on line 4—4 of Fig. 1.

Referring to the figures, it may be seen that the machine tool comprises a base (not shown) on which is supported a bed 10 on which a workpiece may be disposed. The workpiece (not shown) may be retained on the bed by clamps or magnetic attraction as desired.

A pan 12 is also supported on the machine base for holding coolant, it being customary in EDM to provide dielectric coolant in the machining gap to facilitate erosion of the workpiece and to flush away the eroded particles. Means for circulating the coolant, filtering it and maintaining proper coolant level in the pan 12 is provided, but forms no part of the present invention, so description thereof is omitted.

A tool head generally designated 14 is mounted on the machine. This head has a quill for receiving an adaptor 16 (Fig. 3) which carries the cut-off device, and means is provided for manually adjusting the quill longitudinally, laterally, vertically and angularly with respect to the ways 10. This adjusting means is more or less standard on machine tools such as planers, grinders, etc., and is available commercially so it will not be described.

The head 14 also embodies automatic feed means 18, 20, for automatically feeding the cut-off wheel into the work, withdrawing it after the cut has been made and withdrawing it in event of a short circuit in the machining gap, as is generally used in EDM. For a description of such automatic power feed means, reference is made to McKechnie Patent No. 2,588,744 and Matulaitis Patent No. 2,783,411.

Referring now more particularly to Fig. 3, a housing 22 of cast aluminum or the like is secured to the adaptor 16 by a plurality of screws 24. The adaptor has a flat plate 26 on its lower end which is complementary to a flat surface machined on the top of the housing 22.

A pad 28 of insulating material is disposed between the adaptor and the housing, and sleeves 30 of similar insulating material are disposed around the screws 24 such that the entire cut-off head is electrically insulated from the adaptor 16 and consequently from the machine as a whole.

The housing 22 has an annular marginal flange 32 within which is received a pressure plate 34 of annular form. The plate 34 and the housing cover 36 are also made preferably of cast aluminum.

The pressure plate 34 is slotted vertically and horizontally for the reception of a plurality of wear shoes 38. These shoes or wear strips are made of tungsten carbide or similar hard material. As can be seen in Fig. 2, three vertically disposed and one horizontally disposed shoes are provided, but other arrangements may be used.

The cover 36 has similar slots and similar shoes 40 are disposed in these slots. The depth of the slots in the pressure plate and in the cover is such that a substantial portion of each of the shoes protrudes from the members. The shoes are retained in the slots by bolts 42, the heads of which are disposed flush with the wear surfaces of the shoes as shown in Fig. 3.

The cut-off disc itself 44 is preferably of thin brass and is provided with a mounting hole 46 and driving holes 48, as will be further explained. A plurality of adjustable pressure elements 50 is carried by the housing 22. These each comprise a sleeve 52 which carries a coil spring 54, the compression of which is adjustable by means of a manual adjusting screw 56. The springs 54 bear on the pressure plate 34, and thus it is possible to adjust the pressure on the shoes 38 and consequently the rotational alignment of the disc 44.

Mounted in the housing 22 by suitable bearings 58 is a driven shaft 60. This shaft is of tool steel and carries an integral dowel plate 62 which, in turn, is provided with integral dowel pins 64. When the disc 44 is assembled on the cutting head, the hole 46 thereof loosely engages the outer end of the shaft 60 and the dowels 64 are loosely received in the holes 48 of the disc. The housing cover 36 may then be assembled to the head by means of the bolt fasteners 66 which threadedly engage the holes 68. The housing, pressure plate and cover each have a matching recess which provides a machining slot 70, by means of which the disc 44 is able to approach the workpiece.

The housing 22 also carries a driving shaft 72 which is journaled therein in the bearings 74. The shaft 72 carries a pinion 76 which meshes with a gear 78 carried by the driven shaft 60. Suitable spacers and Woodruff keys are provided for mounting and driving the gears and shafts as illustrated.

The shaft 72 is driven by an electric motor (not shown) disposed remotely from the cutting head by means of a flexible drive cable 80. The cable 80 is drivingly coupled to the shaft 72 and to the motor driving shaft through an insulating coupling (not shown) such that the motor is electrically insulated from the cutting head. The cable 80 is covered with a sheath 82 of insulating material and a coupling 84 of similar material is used to fasten the sheath to the adaptor plate 86 of the cutting head assembly.

It may thus be seen that the cutting disc or electrode 44 is supported by the wear shoes 38, 40, for rotation with respect thereto. The pressure plate 34 may be adjusted by means of the adjusting screws 56 to vary the frictional drag between the disc and the shoes and, more importantly, to adjust the plane of the disc such that it will cut true when advanced into the work by the feed mechanism.

The disc thickness is preferably of .004 to .005 inch, and it is necesary for satisfactory cutting that the disc be supported so that it will not buckle or tear under driving stress, will run true without wobble and yet not be retarded in its rotation by excessive friction. The electrode disc does not, of course, mechanically contact the work.

In accordance with EDM practice, the workpiece being cut (not shown) is connected to the positive side of the machining circuit, and the electrode disc 44 is connected to the negative side of the circuit—in this instance, by means of a lead 88 (Fig. 4).

When cutting off sections of hard material, the cutting head is assembled as shown in Fig. 1, a workpiece is clamped on the bed 10 and the power circuit and automatic power feed circuit of the machine are adjusted to provide the desired cutting rate and finish.

I claim:

1. In a device for cutting materials by electrical discharge, a disc electrode having a thickness in the order of .005 inch, a cutting head rotatively mounting said electrode, drive means carried by said head for rotating said electrode, and means carried by said head for rotatably supporting said electrode comprising a pair of plates disposed oppositely adjacent said electrode, and a plurality of spring pressed friction shoes carried by said plates in sliding engagement with the opposite surfaces of said electrode.

2. In a device for cutting materials by electrical discharge, a disc electrode, a cutting head rotatively mounting said electrode, driving means carried by said head for rotating said electrode, means carried by said head for rotatably supporting said electrode comprising, a cover plate disposed adjacent one side of said electrode, a pressure plate disposed adjacent the opposite side of said electrode, a plurality of wear shoes carried by said plates in engagement with said electrode, and means for adjusting the pressure of said wear shoes on said electrode.

3. The combination set forth in claim 2 wherein said wear shoes consist of hard carbide material.

4. In a device for cutting materials by electrical discharge, a thin disc electrode, a cutting head for rotatively mounting said electrode and feeding it into the workpiece, means in said head for mounting said disc and for maintaining rigidity against wobble during rotation, said means comprising a plurality of wear shoes disposed in engagement with the opposite surfaces of said disc, and means for selectively adjusting the frictional drag of said shoes on said disc.

5. The combination set forth in claim 4 wherein said wear shoes are of tungsten carbide.

6. In a device for cutting materials by electrical discharge, a thin disc electrode, a cutting head for rotatively mounting said electrode and feeding it into the workpiece, means in said head for mounting said disc and for maintaining rigidity against wobble during rotation, driving means carried by said head for rotating said disc comprising a dowel plate having dowel pins thereon for engaging holes in said disc, a stub shaft integral with said dowel plate, reduction gear means drivingly associated with said stub shaft, and flexible drive means connected with said reduction gear means for driving same and permitting movement of said head.

7. In a cutting head for cutting materials by electrical discharge, a thin disc electrode rotatively mounted in said head, means carried by said head for rotating said disc, means for maintaining planar alignment of said disc during rotation comprising, a plurality of wear shoes of hard, wear resistant material disposed in frictional engagement with the opposite surfaces of said disc, each pair of oppositely disposed shoes being in axial alignment and radially disposed relatively to said disc.

8. The combination set forth in claim 7 wherein said shoes consist of elongated rectangular sections of carbide material.

9. In a cutting head for cutting materials by electrical discharge, a disc electrode in the order of .005 inch thickness, a housing for encasing and supporting said electrode, said housing having a cut-out portion for exposing a segmental portion of said disc such that the disc may be brought into proximity to a workpiece, means for maintaining planar alignment of said disc during its rotation comprising wear shoes disposed in engagement with the opposite surfaces of said disc under preselected pressure, at least some of said wear shoes being disposed in axial alignment along the marginal edges of said cut-out housing portion.

10. The combination set forth in claim 9 wherein said wear shoes are of tungsten carbide.

References Cited in the file of this patent
UNITED STATES PATENTS

| | | |
|---|---|---|
| 2,007,225 | Strobel | July 9, 1935 |
| 2,610,687 | Betts | Sept. 16, 1952 |